US009864092B2

(12) United States Patent
Torres-Verdin et al.

(10) Patent No.: US 9,864,092 B2
(45) Date of Patent: Jan. 9, 2018

(54) TRACERS FOR FORMATION ANALYSIS

(71) Applicant: Board of Regents, The University of Texas System, Austin, TX (US)

(72) Inventors: Carlos Torres-Verdin, Austin, TX (US); Erich Schneider, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 14/748,958

(22) Filed: Jun. 24, 2015

(65) Prior Publication Data

US 2015/0377011 A1 Dec. 31, 2015

Related U.S. Application Data

(60) Provisional application No. 62/017,319, filed on Jun. 26, 2014.

(51) Int. Cl.
| | | |
|---|---|---|
| *G01V 5/12* | (2006.01) | |
| *C09K 8/03* | (2006.01) | |
| *C09K 8/40* | (2006.01) | |
| *C09K 8/66* | (2006.01) | |
| *G01V 5/08* | (2006.01) | |

(52) U.S. Cl.
CPC .............. *G01V 5/12* (2013.01); *C09K 8/032* (2013.01); *C09K 8/40* (2013.01); *C09K 8/665* (2013.01); *G01V 5/08* (2013.01)

(58) Field of Classification Search
CPC ....... E21B 47/1015; G01V 5/107; G01V 5/12
USPC .... 250/259, 256, 269.1, 269.4, 269.5, 269.6
See application file for complete search history.

(56) References Cited

U.S. PATENT DOCUMENTS

| | | | |
|---|---|---|---|
| 3,456,183 A | 7/1969 | Codrington et al. | |
| 3,784,828 A | 1/1974 | Hayes | |
| 4,883,956 A | 11/1989 | Melcher et al. | |
| 6,001,280 A | 12/1999 | Jones et al. | |
| 6,994,169 B2 * | 2/2006 | Zhang | E21B 43/243 166/250.01 |
| 8,100,177 B2 | 1/2012 | Smith, Jr. et al. | |
| 8,234,072 B2 | 7/2012 | Smith, Jr. et al. | |
| 2002/0153481 A1 * | 10/2002 | Stoller | G01V 5/104 250/266 |
| 2003/0029995 A1 * | 2/2003 | Mullins | G01F 1/7086 250/302 |

(Continued)

FOREIGN PATENT DOCUMENTS

WO 2009105306 8/2009

OTHER PUBLICATIONS

International Search Report and Written Opinion for PCT/US2015/037296 dated Sep. 29, 2015.

(Continued)

*Primary Examiner* — David Porta
*Assistant Examiner* — Blake Riddick
(74) *Attorney, Agent, or Firm* — Meunier Carlin & Curfman LLC (57) ABSTRACT

Disclosed herein methods for determining a property of a formation, for example, when well logging, by feeding a gadolinium tracer fluid into the formation, applying an emitted radiation to the formation to thereby produce a signal, such as a neutron signal, and capturing the signal from the formation.

19 Claims, 7 Drawing Sheets

(56) References Cited

U.S. PATENT DOCUMENTS

| | | | | |
|---|---|---|---|---|
| 2009/0087911 | A1* | 4/2009 | Ramos | E21B 47/1015 436/27 |
| 2009/0205825 | A1* | 8/2009 | Smith, Jr. | E21B 43/26 166/280.1 |
| 2009/0288820 | A1* | 11/2009 | Barron | B01J 13/02 166/249 |
| 2011/0272146 | A1* | 11/2011 | Green | E21B 47/1015 166/250.1 |
| 2011/0282818 | A1* | 11/2011 | Chen | G01V 5/125 706/21 |
| 2012/0031613 | A1* | 2/2012 | Green | C09K 8/805 166/280.1 |
| 2012/0080588 | A1* | 4/2012 | Smith, Jr. | G01V 5/101 250/269.6 |
| 2013/0062057 | A1 | 3/2013 | Smith, Jr. et al. | |
| 2013/0105678 | A1* | 5/2013 | Wilson | G01V 5/101 250/254 |
| 2013/0109100 | A1* | 5/2013 | Sarkar | C09K 8/03 436/27 |
| 2013/0109597 | A1* | 5/2013 | Sarkar | C09K 8/03 507/143 |
| 2014/0284049 | A1* | 9/2014 | DiFoggio | E21B 43/267 166/250.1 |
| 2014/0323364 | A1* | 10/2014 | Sherwood | C09K 8/588 507/219 |
| 2015/0322776 | A1* | 11/2015 | Blair | E21B 47/1015 166/250.12 |

OTHER PUBLICATIONS

Ellis et al. Well Logging for Earth Scientists, Second Edition, Springer, The Netherlands, 2007, pp. 247-413.

"Poppant Tables 2015," World Oil, Gulf Publishing Company, Sep. 2015, pp. 21-35.

Liang et al. "A comprehensive review on proppant technologies." Petroleum, 2016, 2, 26-39.

* cited by examiner

TRACERS FOR FORMATION ANALYSIS

BACKGROUND

When drilling boreholes into formations in the earth's subsurface it is desirable to obtain information related to the nature and structure of the formations penetrated by the borehole. To this end, many different tools have been developed to measure (log) certain physical properties of the borehole and surrounding formations. For example, the depth location, borehole size, hydrocarbon pore volume, porosity, lithology, and permeability of a subsurface formation are often deduced from measurable quantities during drilling such as electrical resistivity, density, photoelectric factor (Pe), hydrogen index, natural (spontaneous) radioactivity, acoustic velocity, nuclear magnetic resonance, and thermal neutron capture cross section (Sigma), among others.

Logging tools typically carry a source that emits energetic radiation into the formation and one or more detectors that can sense the resulting interactions of the radiation. Detected signal data are typically transmitted uphole, temporarily stored downhole for later processing, or combined in both techniques, to evaluate the formation from which the data were gathered.

One technique for formation logging uses gamma ray density probes, which are devices that incorporate a gamma ray source and a gamma ray detector, often shielded from each other to prevent the detector from counting gamma radiation emanated directly from the source. During the operation of the probe, gamma rays (photons) are emitted from the source and enter the formation to be studied. In the formation, they interact with the atomic electrons of the material of the formation by either photoelectric absorption, by Compton Scattering, or by pair production. In photoelectric absorption as well as pair production, the photon involved in the interaction is removed, but in pair production two lower-energy photons are formed.

In Compton scattering, the involved photon loses some of its energy while changing its original direction of travel, the loss of energy being a function of the scattering angle. Some of the photons emitted from the source into the formation material are accordingly scattered back toward the detector. Many scattered photons do not reach the detector, because their direction is again changed by a second Compton scattering, or they are thereafter absorbed by the photoelectric absorption process or the pair production process. The scattered photons which reach the detector and interact with it are counted by electronic counting equipment associated with the detector to produce count rates (e.g., counts per unit time). The resulting data are then used to infer the bulk density of the formation, which can be used to determine the formation's porosity.

Another technique for logging uses neutrons. Here, a either a chemical or a pulsed neutron source emits neutrons into the formation and thermal and/or epithermal neutron detectors measure the neutron flux at several distances from the neutron source. The neutron flux depends on the properties of the formations through which the neutrons pass in traveling from source to detector. Neutrons lose kinetic energy through inelastic and elastic scattering, and neutrons—particularly neutrons that have slowed down or 'thermalized'—can be absorbed by the nuclei of formation atoms. The neutron slowing down time measured by one or more of the detectors via count rates is a shallow measurement of hydrogen index, which can be used to determine the formation's solid composition, porosity, and type of saturating fluid. Traditional porosity measurements rely on deriving liquid-filled porosity from the ratio of the neutron fluxes from at least two different distances from the source.

Difficulties encountered in neutron porosity and gamma ray density measurements include the disturbing effects of undesired interfering materials located between the probe and the formation sample, such as drilling fluid and mud cake on the borehole wall. Drilling fluid invasion is a process that occurs in a well being drilled with higher wellbore pressure (for example, caused by large mud weights) than formation pressure. The liquid component of the drilling fluid (i.e., mud filtrate) continues to "invade" the porous and permeable formation until the solids present in the mud (for example, bentonite or barite) clog enough pores to form a mudcake capable of preventing further invasion.

Invasion also has significant implications for well logging. In some cases, the "depth of investigation" of a well logging tool is only a few inches, and it is possible that drilling fluid has invaded beyond this depth. Therefore the readings that are taken that are influenced by the formation fluids are measuring mud filtrate properties rather than formation (in situ) properties, or, in some cases, a combination of mud filtrate properties and formation properties. In the case of Sigma measurements in particular, the invasion of mud filtrate into the formation can mask the actual nuclear properties of in-situ hydrocarbons and water.

Logging probes have tried to compensate for the effect of mudcake density and mudcake thickness on formation density, and hence on porosity measurements, by including two or more detectors axially spaced along the borehole at different distances from the source of radiation. The near or short spaced detector is for receiving radiation which has scattered mainly in the materials near the borehole wall, including the mudcake. The far or long-spaced detector(s) is for receiving radiation which has scattered principally in the formation. The difference in time-decay response is associated with a number of factors, including the solid composition, fluid composition, presence/absence of invasion, and porosity.

Still, most active gamma logging systems require complex collimation schemes to narrowly define either the beam of radiation emanating from the source to direct it into a specific region of the formation or the beam of radiation received back by the detector to ensure that only radiation back-scattered from a particular region of the formation was detected, or both. With these schemes, it is presupposed that the region of interaction between the radiation and the formation can be narrowly defined and restricted to a small region. Not only is precise collimation of radiation beams difficult to accomplish, but the assumption that a collimated beam only interacts with a precisely definable portion of the formation surrounding the borehole is erroneous.

Given these and other difficulties with well logging operations, there is a need for improved accuracy and contrast when determining a property of a formation. Indeed, a large contrast in Sigma (i.e., the nuclear capture cross-section) is necessary to quantify the effect of filtrate invasion, i.e., salty mud filtrate with large concentrations of $Cl^-$ invading low-absorption media such as hydrocarbon-bearing rocks. The disclosed methods address these and other needs.

SUMMARY

In accordance with the purposes of the disclosed materials, devices, and methods, as embodied and broadly described herein, the disclosed subject matter relates to methods for determining a property of a formation. In some examples, the methods disclosed herein can be used for well logging, including logging-while-drilling, wireline logging, and cased-hole logging.

The disclosed methods can comprise, for example, feeding a gadolinium tracer fluid into the formation, applying an emitted radiation to the formation to thereby produce a signal, capturing the signal, and processing the signal to obtain a property of the formation.

The formation can be any formation of interest. In some examples, the formation is adjacent to a well, an aquifer, a hydrocarbon-producing reservoir, a geothermal reservoir, a chemically contaminated rock formation, chemically contaminated soil, or combinations thereof. In some examples, the property comprises porosity, solid composition, water content, hydrocarbon content, contaminant content, or combinations thereof.

The gadolinium tracer fluid comprises gadolinium. In some examples, the gadolinium tracer fluid can comprise water and a water soluble gadolinium compound (e.g., $Gd(NO_3)_3$). In some examples, the gadolinium tracer fluid can comprise a liquid carrier fluid and a plurality of gadolinium particles. The liquid carrier fluid can comprise a spacer fluid, a drilling fluid, a cementing fluid, a fracturing fluid, a mud fluid, a synthetic fluid, or combinations thereof. In some examples, the gadolinium particles can comprise gadolinium oxide. The gadolinium particles can, for example, have a mean diameter of 10 micrometers (μm) or less. In some examples, the concentration of the gadolinium particles in the gadolinium tracer fluid can be 0.001-1% by volume of the overall fluid volume within the formation.

In some examples, the emitted radiation comprises a first number of neutrons at a first energy. In some examples, the emitted radiation can be applied at a first time.

The signal can, for example, comprise neutrons and/or gamma rays. When the signal comprises neutrons, these neutrons are referred to herein as a second number of neutrons, which are at a second energy. In some examples, the signal is captured at a second time.

In further examples, the method comprises capturing an additional signal. In some examples, the method further comprises processing the additional signal. In some examples, the additional signal can be captured at a third time. The additional signal can, for example, comprise neutrons and/or gamma rays. When the additional signal comprises neutrons, these neutrons are referred to herein as a third number of neutrons, which are at a third energy.

In some examples, the method further comprises capturing a two or more additional signals. In some examples, the two or more additional signals comprise neutrons and/or gamma rays.

Additional advantages of the disclosed subject matter will be set forth in part in the description that follows, and in part will be obvious from the description, or can be learned by practice of the aspects described below. The advantages described below will be realized and attained by means of the elements and combinations particularly pointed out in the appended claims. It is to be understood that both the foregoing general description and the following detailed description are exemplary and explanatory only and are not restrictive.

BRIEF DESCRIPTION OF THE FIGURES

The accompanying figures, which are incorporated in and constitute a part of this specification, illustrate several aspects described below.

FIG. 2 is a pair of graphs showing the (A) absolute and (B) relative change in the intrinsic Sigma of a limestone block initially saturated with fresh water as a function of added $Gd_2O_3$ in thousandths of pore volume.

DETAILED DESCRIPTION

The methods and devices described herein may be understood more readily by reference to the following detailed description of specific aspects of the disclosed subject matter, figures and the examples included therein.

Before the present devices and methods are disclosed and described, it is to be understood that the aspects described below are not intended to be scope by the specific devices and methods described herein, which are intended as illustrations. Various modifications of the devices and methods in addition to those shown and described herein are intended to fall within the scope of that described herein. Further, while only certain representative devices and method steps disclosed herein are specifically described, other combinations of the devices and method steps also are intended to fall within the scope of that described herein, even if not specifically recited. Thus, a combination of steps, elements, components, or constituents may be explicitly mentioned herein or less, however, other combinations of steps, elements, components, and constituents are included, even though not explicitly stated.

General Definitions

The term "comprising" and variations thereof as used herein is used synonymously with the term "including" and variations thereof and are open, non-limiting terms. Although the terms "comprising" and "including" have been used herein to describe various examples, the terms "consisting essentially of" and "consisting of" can be used in place of "comprising" and "including" to provide for more specific examples of the invention and are also disclosed.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the component" includes mixtures of two or more such components, and the like.

"Optional" or "optionally" means that the subsequently described event or circumstance can or cannot occur, and that the description includes instances where the event or circumstance occurs and instances where it does not.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

Methods

Disclosed herein are methods for determining a property of a formation. In some examples, the methods disclosed herein can be used for well logging, measurements performed on samples (e.g., laboratory core analysis), or combinations thereof. Well logging, also known as borehole logging, is the practice of making a detailed record (a well log) of the geologic formations penetrated by a borehole. The logs can be based either on visual inspection of samples brought to the surface (geological logs) or on physical measurements made by instruments lowered into the borehole (geophysical logs). Some types of geophysical well logs can be done during any phase of a well's history: drilling, immediately after drilling, completing, producing, or abandoning. Well logging can be performed in boreholes drilled for oil and gas, groundwater, mineral and geothermal exploration, as well as part of environmental and geotechnical studies. Well logging operations can be performed during the drilling process to provide real-time information about the formations being penetrated by the borehole, or once the well has reached its total depth and the whole depth of the borehole can be logged.

Wireline logging is a type of well logging and can be used to obtain a continuous record of a formation's properties after drilling has been completed. Wireline logging is performed by lowering a logging tool, a string of one or more instruments on the end of a wireline, into a borehole and recording properties using a variety of sensors. Logging-while-drilling (LWD) is another type of well logging that is used to obtain a real time log of a formation's properties as the borehole is being drilled. LWD is performed with logging tools attached to the drill bit and drill string and data are transmitted to the drilling operator as the borehole is being constructed. In either case, geophysical data as a function of well bore location are acquired and analyzed. The measurements and the associated analysis can then be used to infer further properties, such as solid composition, porosity, fluid composition, hydrocarbon saturation, permeability, and formation pressure. Cased-hole logging is another type of well logging that is undertaken after the well has been cemented and cased. Cased-hole logging can be used to assess fluid variations (i.e., type and concentration) resulting from production.

There are a variety of logging tools available that are used to characterize a formation. Logging tools are used to measure the natural gamma ray, electrical, acoustic, stimulated radioactive responses, electromagnetic, nuclear magnetic resonance, pressure and other properties of the formations and their contained fluids. Gamma ray and neutron tools are widely used in the petrochemical industry, during logging-while-drilling, wireline, and cased-hole. Gamma ray and neutron tools are particularly well suited for the methods disclosed herein.

Disclosed herein are methods for determining a property of a formation. The methods can comprise, for example, feeding a gadolinium tracer fluid into the formation, applying an emitted radiation to the formation to thereby produce a signal, capturing the signal from the formation, and processing the signal to obtain a property of the formation. The gadolinium tracer fluid can be used as a tracer in produced wells for surveillance of injection fronts and breakthrough in enhanced recovery operations. The gadolinium tracer fluid can also improve shallow-invasion detection.

The formation can be any formation of interest that contains a borehole to be logged. In some examples, the formation is adjacent to a well (e.g., petroleum, natural gas, water, $CO_2$), an aquifer, mineral deposit, a contamination site, or combinations thereof. The formation can either be on or off-shore. In some examples, the property that is obtained comprises Sigma (i.e., nuclear capture cross section), hydrogen index, density, porosity, solid content, water content, fluid content, fluid composition, hydrocarbon content, contaminant content, permeability, or any combination thereof.

In some examples, the gadolinium tracer fluid can be fed to the formation at substantially the same location as the emitted radiation and/or signal. For example, the gadolinium tracer fluid can be fed into a borehole and the emitted radiation and signal are, respectively, applied to and captured from the same borehole during LWD or wireline logging. In other examples, the gadolinium tracer fluid can be fed to the formation at a substantially different location than the emitted radiation and/or signal. For example, the gadolinium tracer fluid can be fed to an injector well and the emitted radiation and signal are, respectively, applied to and captured from a producer well located at some distance away (e.g., at least 2 m) from the injector well.

Gadolinium is ferromagnetic at temperatures below 20° C. and is strongly paramagnetic above this temperature. Gadolinium exhibits a magnetocaloric effect, whereby its temperature increases when it enters a magnetic field and decreases when it leaves the magnetic field.

Gadolinium combines with most elements to form Gd(III) derivatives. Unlike other rare earth elements, metallic gadolinium is relatively stable in dry air. However, it tarnishes quickly in moist air, forming a loosely adhering gadolinium (III) oxide ($Gd_2O_3$), which spalls off, exposing more surface to oxidation. Gadolinium has exceptionally high absorption of neutrons regardless of its chemical form.

The gadolinium tracer fluid comprises gadolinium. In some examples, the gadolinium tracer fluid can comprise water and a water soluble gadolinium compound (e.g., $Gd(NO_3)_3$). In some examples, the gadolinium tracer fluid can comprise a liquid carrier fluid and a plurality of gadolinium particles. The liquid carrier fluid can comprise a spacer fluid, a drilling fluid, a cementing fluid, a fracturing fluid, a mud fluid, a synthetic fluid, or combinations thereof. In some examples, the gadolinium particles can comprise gadolinium oxide. In some examples, the gadolinium oxide comprises $Gd_2O_3$. For example, $Gd_2O_3$ can be pre-mixed in a mud and then feed into a formation. It has been found herein that such gadolinium tracer fluids can maximize the difference in detector response (e.g., the signal) when invasion takes place.

Several methods are known for the synthesis of gadolinium oxide particles, mostly based on precipitation of the hydroxide by the reaction of gadolinium ions with hydroxide, followed by thermal dehydration to the oxide. The particles can be coated with a protective material to avoid the formation of larger polycrystalline aggregates.

The gadolinium particles can, for example, have a mean diameter of 10 μm or less (e.g., 9 μm or less, 8 μm or less, 7 μm or less, 6 μm or less, 5 μm or less, 4 μm or less, 3 μm or less, 2 μm or less, 1 μm or less, 900 nanometers (nm) or less, 800 nm or less, 700 nm or less, 600 nm or less, 500 nm or less, 400 nm or less, 300 nm or less, 200 nm or less, or 100 nm or less). In some examples, the gadolinium particles can have a mean diameter of 1 nm or more (e.g., 100 nm or more, 200 nm or more, 300 nm or more, 400 nm or more, 500 nm or more, 600 nm or more, 700 nm or more, 800 nm or more, 900 nm or more, 1 μm or more, 2 μm or more, 3 μm or more, 4 μm or more, 5 μm or more, 6 μm or more, 7 μm or more, 8 μm or more, or 9 μm or more). In some examples, the gadolinium particles can have a mean diameter of 1 nm to 10 μm (e.g., 1 nm to 5 μm, 5 μm to 10 μm, 1 nm to 2.5 μm, 2.5 μm to 5 μm, 5 μm to 7.5 μm, 7.5 μm to 10 μm, 1 nm to 1 μm, 1 nm to 500 nm, 500 nm to 1 μm, 1 nm to 250 nm, 250 nm to 500 nm, 500 nm to 750 nm, 750 nm to 1 μm, 1 nm to 100 nm, 1 nm to 50 nm, 50 nm to 100 nm, 1 nm to 25 nm, 25 nm to 50 nm, 50 nm to 75 nm, or 75 nm to 100 nm).

In some examples, the concentration of the gadolinium particles in the gadolinium tracer fluid can be 0.001% or more by volume of the overall fluid volume within the formation (e.g., 0.005% or more, 0.01% or more, 0.05% or more, 0.1% or more, or 0.5% or more). In some examples, the concentration of the gadolinium particles in the gadolinium tracer fluid can be 1% or less (e.g., 0.5% or less, 0.1% or less, 0.05% or less, 0.01% or less, or 0.005% or less). In some examples, the concentration of the gadolinium particles in the gadolinium tracer fluid can be 0.001-1% (e.g., 0.001-0.05%, 0.05%-1%, 0.001-0.005%, 0.005%-0.01%, 0.01%-0.05%, 0.05%-0.1%, 0.1%-0.5%, 0.5%-1%, 0.005%-0.05%, or 0.01%-0.1%).

In some examples, the emitted radiation can comprise a first number of neutrons at a first energy. In some examples, the emitted radiation can be applied at a first time. The neutrons can, for example, be emitted by a chemical source, such as Americium Beryllium (Am—Be), Plutonium Beryllium (Pu—Be), or Californium-252, or generated by an electronic neutron generator, such as minitron or deuterium-tritium accelerator. The first energy can, for example, be from 0.1 MeV to 14.1 MeV, or from 4 MeV to 11 MeV.

The signal can comprise neutrons and/or gamma rays, for example, a thermal neutron population, epithermal population, gamma rays or combinations thereof. In some examples, the signal is captured at a second time. When the signal comprises neutrons, the signal can be said to comprise a second number of neutrons, which are at a second energy. In some examples, the first energy (from the emitted radiation) is higher than the second energy (from the signal), and/or the first number of neutrons (from the emitted radiation) is higher than the second number of neutrons (from the signal).

In some examples, the first number of neutrons at the first energy can inelastically or elastically interact with the formation, thereby producing a signal. In some examples, the signal is captured using a pulsed neutron capture tool, a compensated neutron tool, a single detector neutron tool, or combinations thereof.

Mechanics of elastic collisions predict that the maximum energy transfer occurs during collisions of two particles of equal mass. Therefore, a hydrogen atom (H) will cause a neutron to slow down the most, as they are of roughly equal mass. As hydrogen can be associated with the amount of water and/or oil present in the formation, measurement of the neutron population within the investigated volume of the formation can be linked to porosity of the formation, water content of the formation, hydrocarbon content of the formation, fluid composition, contaminant content of the formation, or combinations thereof.

In some examples, processing the signal can comprise determining a time delay. The time delay can, for example, comprise the difference between the second time and the first time. In some examples, processing the signal can comprise determining a neutron number change The neutron number change can, for example, comprise the difference between the first number of neutrons and the second number of neutrons.

In some examples, the method can further comprise capturing an additional signal. In some examples, the method can further comprise processing the additional signal to obtain a property of the formation.

The additional signal can comprise, for example, neutrons and/or gamma rays. In some examples, the additional signal is captured at a third time. When the additional signal comprises neutrons, the neutrons are said to comprise a third number of neutrons, which are at a third energy. The additional signal can be captured at the same detector that captures the signal (e.g., second number of neutrons) or at a different detector.

In some examples, processing the additional signal can comprise determining a rate of decay, wherein the rate of decay is the difference between the third number of neutrons and the second (or first) number of neutrons over a time interval, wherein the time interval is the difference between the third time and the second (or first) time. This can be done in combination with the processing of the original, first signal.

In some examples, the method further comprises capturing a two or more additional signals. The two or more additional signals can comprise an electrical signal, an electromagnetic signal, an acoustic signal, a neutron signal, or combinations thereof. In some examples, the two or more additional signals comprise gamma rays. For example, the gamma rays can be emitted when neutrons are absorbed.

Devices

Also disclosed herein are devices which can be used in accordance with the methods described herein. For example, disclosed herein are methods for determining properties (e.g., Sigma, density, and porosity) of formations that comprise using a logging tool. The logging tool, for example, can apply the emitted radiation and capture the signal (and optionally additional signals).

In some examples, the logging tool can comprise a pulsed neutron generator (e.g., to apply the emitted radiation) having a monitoring device (i.e., a neutron monitor) that monitors the neutron output of the generator (e.g., to capture and/or process the signal). In some embodiments, neutron monitors can be used to determine the average and/or instantaneous neutron output of the generator. In some examples, the tool can comprise a single gamma-ray detector (e.g., to capture the one or more of the signals), without relying on two detectors for environmental effects correction. Gamma-ray detectors on such tools can be used to determine the gamma-ray die-away, which can be used to determine Sigma, and the count rates, which can be used for the estimation of formation porosity. In some examples, the logging tool may use a dual-burst pulsing sequence, or more complex multiple bursting sequence, which can make it possible to correct the apparent formation properties (e.g., Sigma), which can be susceptible to interference by borehole signals.

The space between the neutron source and the gamma-ray detector can be partially or completely filled with shielding material. This material can reduce the direct neutron flux from the source to the detector and also can prevent gamma-rays originating near the source inside and outside the tool from traveling to the detector. Materials for the shielding, for example, include tungsten (shielding of high energy neutrons and gamma-rays), materials containing a high concentration of hydrogen (e.g., Ti hydride or organic compounds) to moderate intermediate energy neutrons (neutrons with an energy below several MeV), and materials containing a high concentration of 10B (either using natural boron, or boron enriched with 10B), cadmium or other neutron absorbers. The shielding can be composed of a single material or a mix of the different shielding materials. Alternatively, the shield may comprise multiple layers of the above materials to optimize the shielding performance.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for.

Example 1

General Process for Determining Formation Sigma

When the emitted radiation contains neutrons, the signal can comprise thermal or epithermal neutrons, which is used to determine the neutron capture cross section or "Sigma". For example, measuring Sigma allows one to determine the oil saturation and/or water saturation of the formation to be determined Sigma can also be determined from the rate of decline in the count of the gamma rays produced following the capture of thermal neutrons by nuclei in the formation.

The general method involves irradiating a formation from a borehole tool with a short burst of fast neutrons (pulsed neutrons) and measuring the decline rate of slow neutrons or gamma rays which result from thermal neutron capture in the formation. These measurements provide an indication of the identity of the nuclei of the materials present in the formation.

In its simplest form, a Sigma logging tool comprises a pulsed neutron generator and one or more gamma-ray detectors. The gamma-ray detectors use two or more time gates following the burst to determine the characteristic die-away time of the capture gamma-ray after the end of the burst. The die-away time is inversely related to the apparent capture cross section of the formation as shown in equation (1) (which is equation 15.3 of Darwin V. Ellis and Julian M. Singer, "Well Logging for Earth Scientists," Second Edition, Springer, 2007, pp. 388 and 692, which is incorporated by reference herein in its entirety for its teachings of logging methods and tools and calculations of sigma):

$$\Sigma = 4550/\tau \quad (1)$$

where $\Sigma$ is the macroscopic formation capture cross section in capture units (c.u.) and $\tau$ is the time constant of the time decay in microseconds, which is assumed to be exponential:

$$N = N_0 \cdot e^{-t/\tau} \quad (2)$$

The lifetime curve of thermal neutrons is a composite of captures occurring in the borehole including casing and surrounding cement in cased holes, in the porous invaded zone surrounding the borehole, and in the uninvaded formation beyond. All these capture processes occur with different decay times, and it is possible to decipher the formation decay process from the composite capture processes. A typical approach is to monitor the capture process with two or more time windows after the neutron burst. The two or more time window measurements can then be used to derive the desired decay times. One method for making a neutron lifetime measurement, for quantitative determination of formation characteristics, is to observe the complete decline curve of the neutron induced radiation (thermal neutrons or capture gammas) from the termination of the neutron pulse to the disappearance of all induced radiation (excluding the activation or background gammas). A refinement of the technique uses dual bursts of unequal length (duration) and measuring the decay times after each of the bursts. This technique allows separation between the apparent borehole and the formation decay times.

Modern Sigma logging tools use at least two gamma-ray detectors at two different axial spacings from the pulsed neutron source. The use of two different spacings makes it possible to correct for environmental effects, which influence the measured (apparent) Sigma. Specifically, the detector with the shorter spacing is more susceptible to the capture cross section of the borehole (borehole fluid and if present casing and cement) and also more sensitive to the effect of neutron diffusion (as opposed to neutron capture) on the apparent neutron decay time. Therefore, a comparison between signals detected by the short spacing detector and the long spacing detector can provide a compensation for these effects.

The presence of two or more detectors also makes it possible to determine count rate ratios. The ratios can be computed either between the total average count rates of the two detectors, between the inelastic count rates or between the capture count rates. These ratios are inversely related to the formation porosity, i.e., the ratio of the short-spacing and long-spacing detector count rates will decrease with increasing formation porosity. Therefore, the ratios can be used to determine the porosity of the formation in a manner similar to the neutron porosity measurement of the CNL tools. The use of a ratio, while reducing some of the environmental effects on the final answer, is largely dictated by the fact that the neutron output of the pulsed generator is not adequately known. In addition, the output of a pulsed neutron generator changes as a function of time, temperature and age of the generator.

Any of these methods can be used in the methods disclosed herein. That is, a gadolinium tracer fluid can be added to the formation (in the borehole being logged or at a different location from the borehole being logged) and then Sigma can be determined

Example 2

Figure 1:
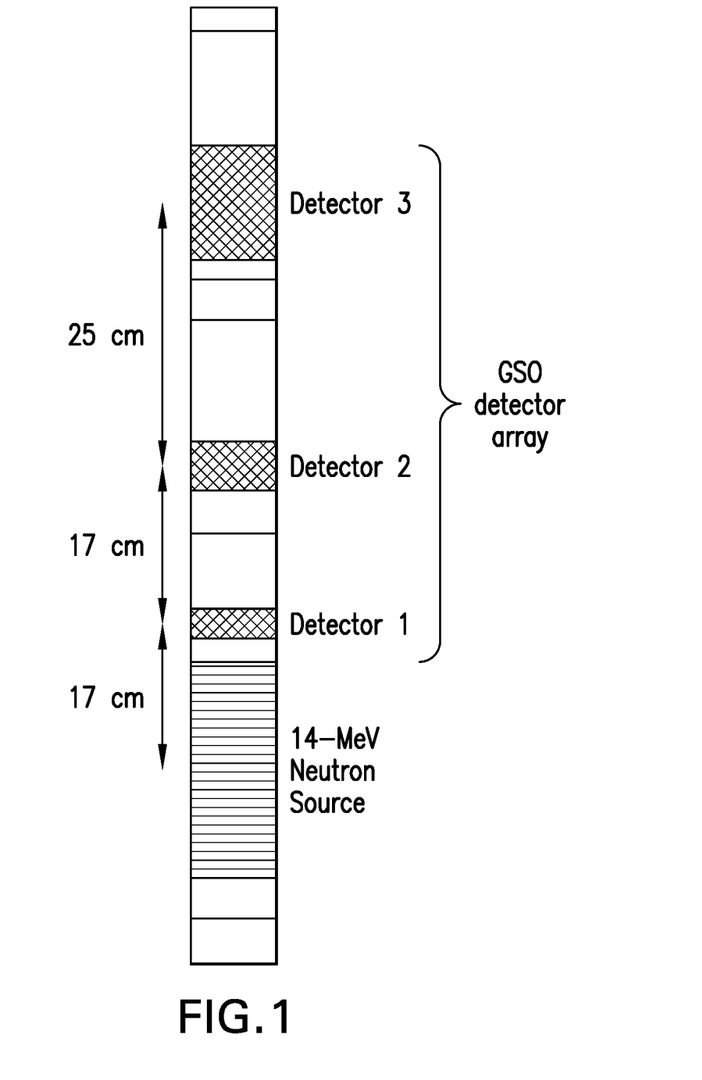
FIG. 1 is a schematic of a logging tool with a 14 MeV source and array gamma-ray detectors to assess the presence of mud-filtrate invasion and original fluid composition in LWD logging.

The source used in the study was made of a 14-MeV neutron generator and three Gadolinium Oxyorthosilicate (GSO) detectors at different spacings from the source (FIG. 1). The detector spacing provided the tool with three different radial depths of investigation that allow it to sense invasion in the shallow near-wellbore zone.

Figure 2A:
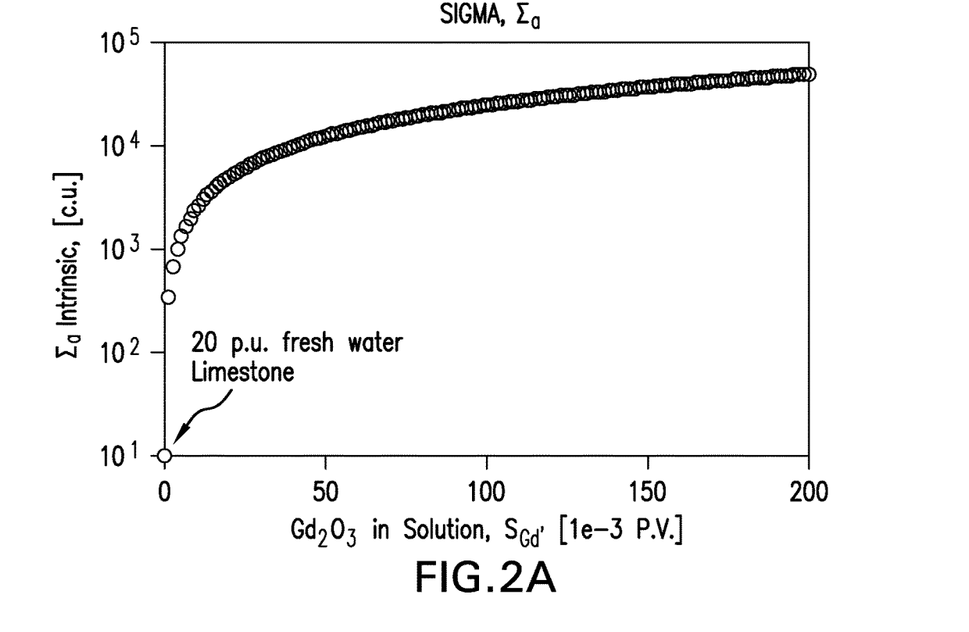
Figure 2B:
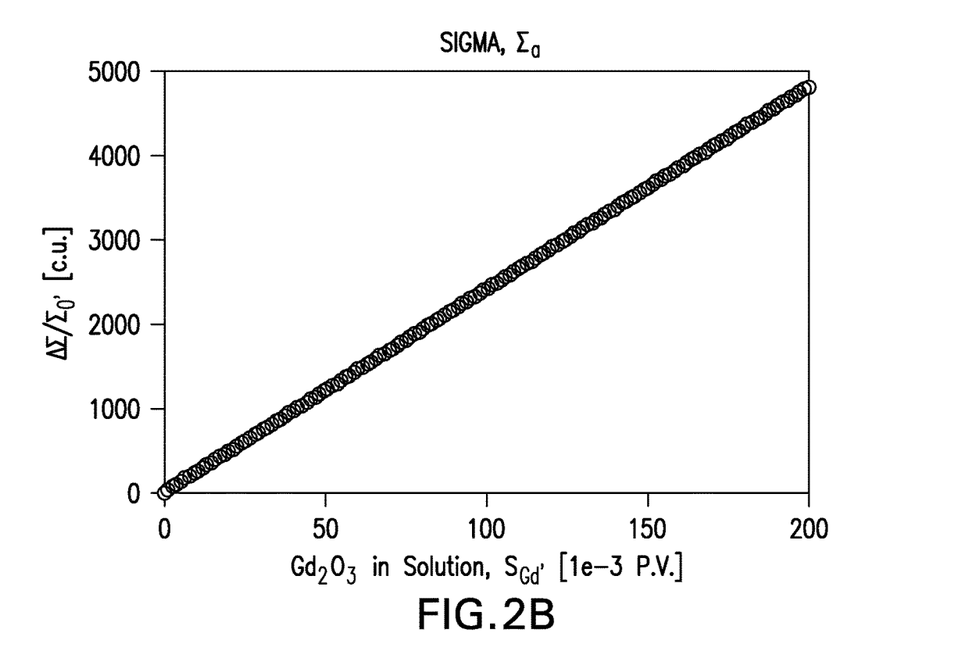
Figure 3:
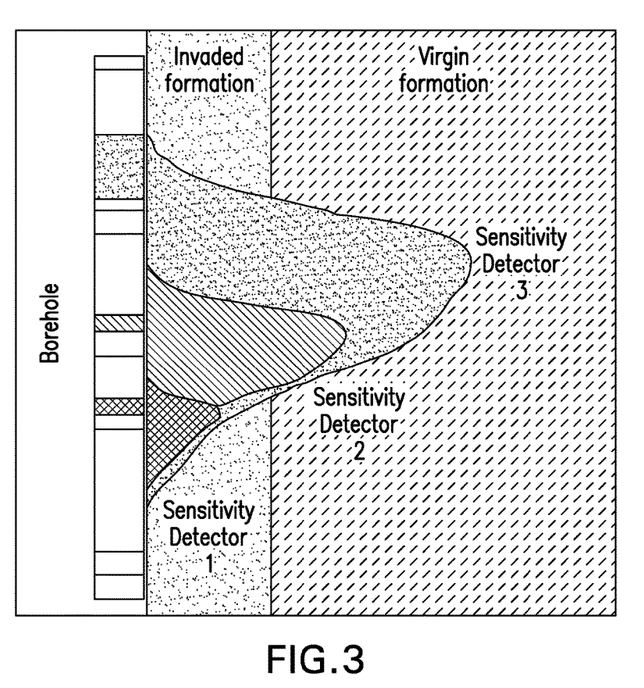
FIG. 3 is a schematic of the three detectors with different radial and depth investigation, sensing different portions of the invaded and virgin zones.

The absolute and relative change in Sigma as a function of the concentration of $Gd_2O_3$ is shown in FIG. 2. A sketch of three detectors with different radial and vertical depths of investigation sensing different portions of invaded and virgin zones is shown in FIG. 3.

Figure 4:
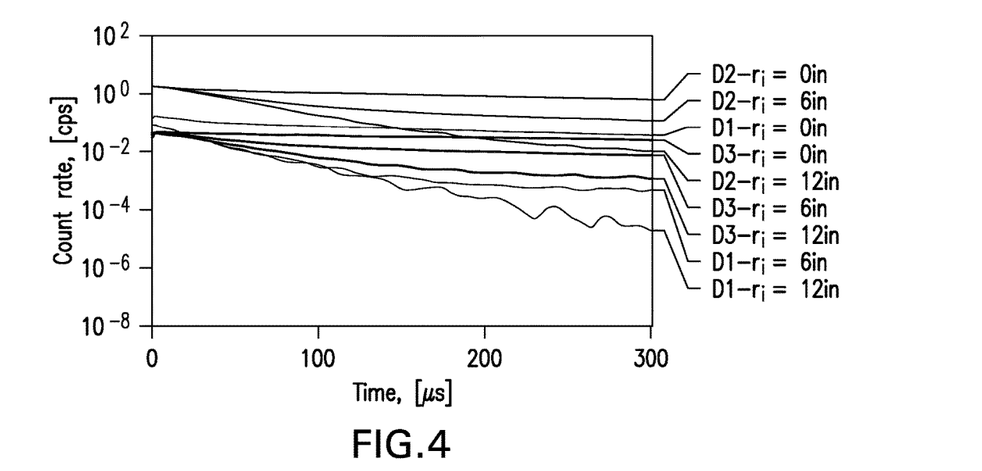
FIG. 4 is a graph showing the MCNP-simulated time decays for the three detectors of a Sigma commercial tool, illustrating the impact of invasion of mud filtrate with 1e-2 volume fraction of $Gd_2O_3$.
Figure 5:
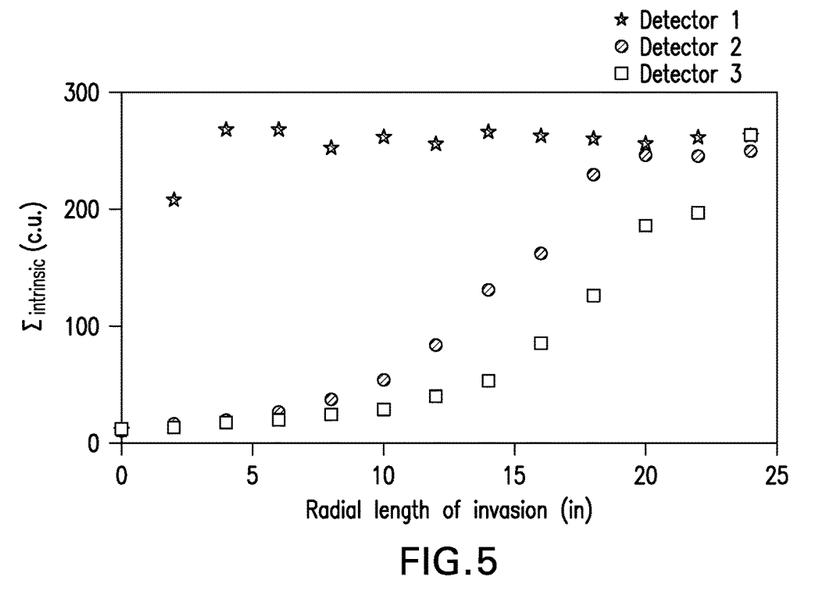
FIG. 5 is a graph of Sigma as a function of radial length of invasion of mud filtrate with 1e-2 volume fraction of $Gd_2O_3$.

FIG. 4 shows that adding $Gd_2O_3$ to the mud filtrate has two benefits: first, the differentiation of invasion using a multi-detector Sigma tool becomes very clear and inversion of decays potentially becomes more stable. Second, the presence of gadolinium generates diffusion effects that extend the depth of investigation of the tool. FIG. 5 displays Sigma profiles as a function of invasion that further improves the extended depth of investigation in the medium- and long-spaced detectors. Typically, the long spaced gamma-ray detector would sense up to 15 inches into the formation. FIG. 5 describes an extension in depth of investigation up to 10 inches by adding a small amount of $Gd_2O_3$ to mud filtrate.

Figure 6:
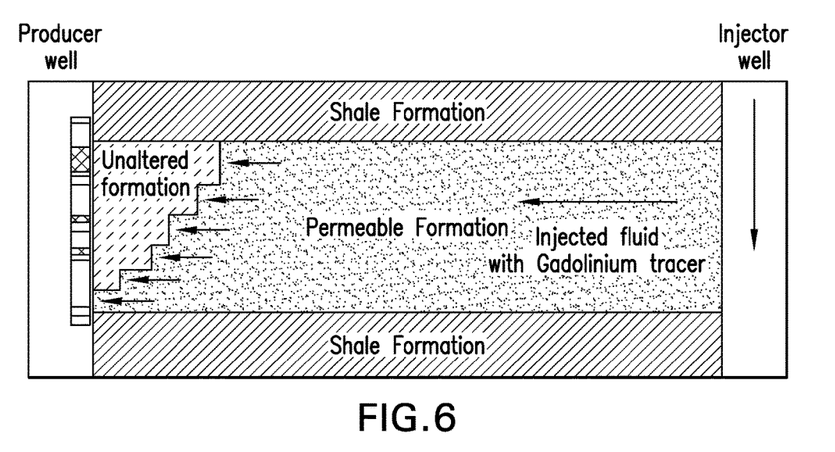
FIG. 6 is a schematic of time-lapsed Sigma measurements to assess invasion breakthrough. Invasion fluid with small amounts of $Gd_2O_3$ generates changes of several orders of magnitude in Sigma logs.
Figure 7:
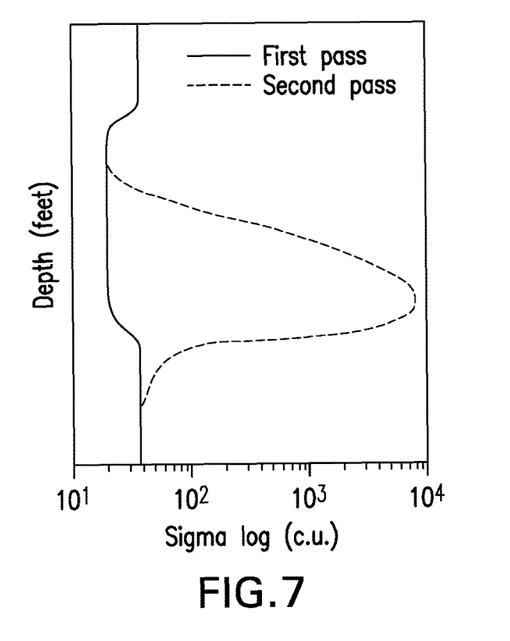
FIG. 7 is a time-lapse Sigma log for the case of injection fluid breakthrough with small concentrations of Gd causing Sigma readings never present in subsurface formations, and therefore, making possible the detection of the displacement front.

Another application of the gadolinium tracer fluid is as an injection tracer (FIG. 6). FIG. 7 shows time-lapse Sigma logs for the case of injection, wherein the "first pass" represents an early time point, such as immediately after drilling. As such, there has not been much time for the fluids to penetrate, and very little is detected in the Sigma log. The "second pass" represents another measurement at a later time, such that the fluids may have penetrated the formation, which is reflected in a higher signal in the Sigma log.

Example 3

A series of irradiation experiments was completed at beam port 2 of the UT TRIGA reactor as validation of a disclosed fluid tracer (gadolinium nitrate, $Gd(NO_3)_3$) for enhanced neutron capture properties. A $BF_3$ neutron detector was used and the concentration of Gd was varied in the trials.

Figure 8:
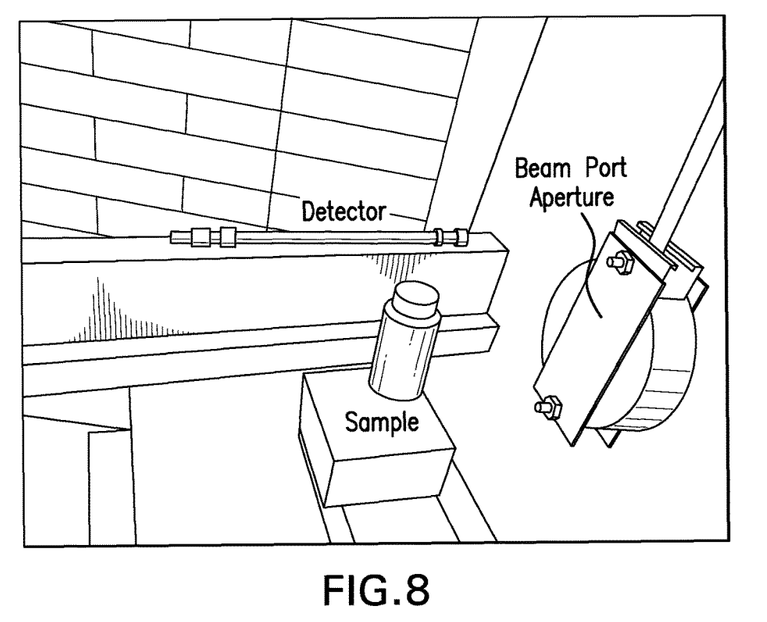
FIG. 8 is a photograph of the unshielded experimental configuration.
Figure 9:
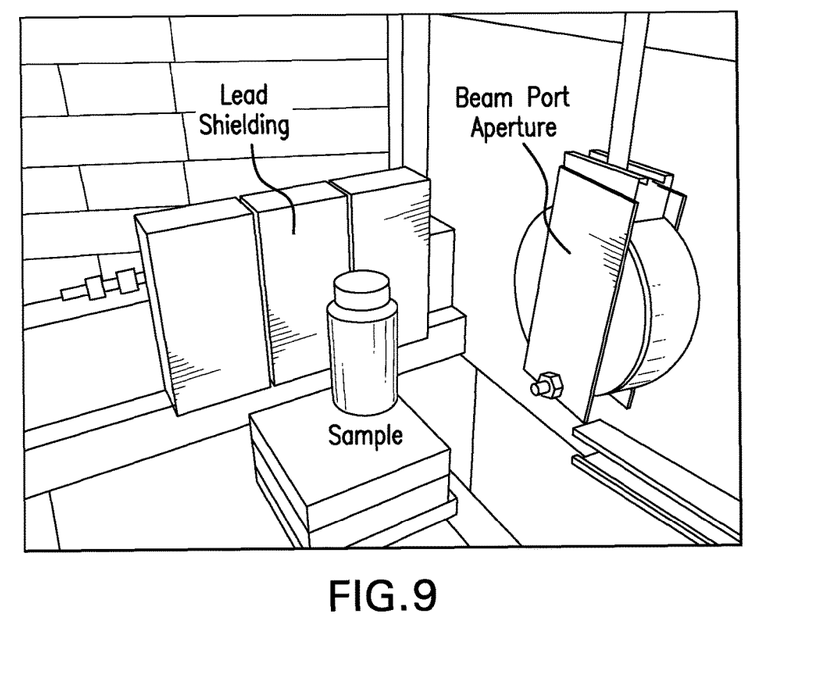
FIG. 9 is a photograph of the shielded experimental configuration.

FIG. 8 is a photograph of the unshielded experimental configuration while FIG. 9 is a photograph of the experimental configuration that includes the lead shielding. The sample container, detector, and lead shielding were supported by Teflon blocks.

The sample was in a Teflon container, and was initially composed of distilled water. The sample was centered axially on the beam line, and was located 55.5 cm from the beam port face. The detector was positioned parallel to the beam line, with the midline of the active volume 21.7 cm from the midpoint of the sample container. Gamma emitting cobalt and cesium check sources were used to establish the lower-level discriminator setting for the $BF_3$ detector. The lower-level discriminator rejects events that deposit less than a threshold amount of energy in the detector and serves to screen out most gamma ray interactions while continuing to count neutron interactions.

Figure 11:
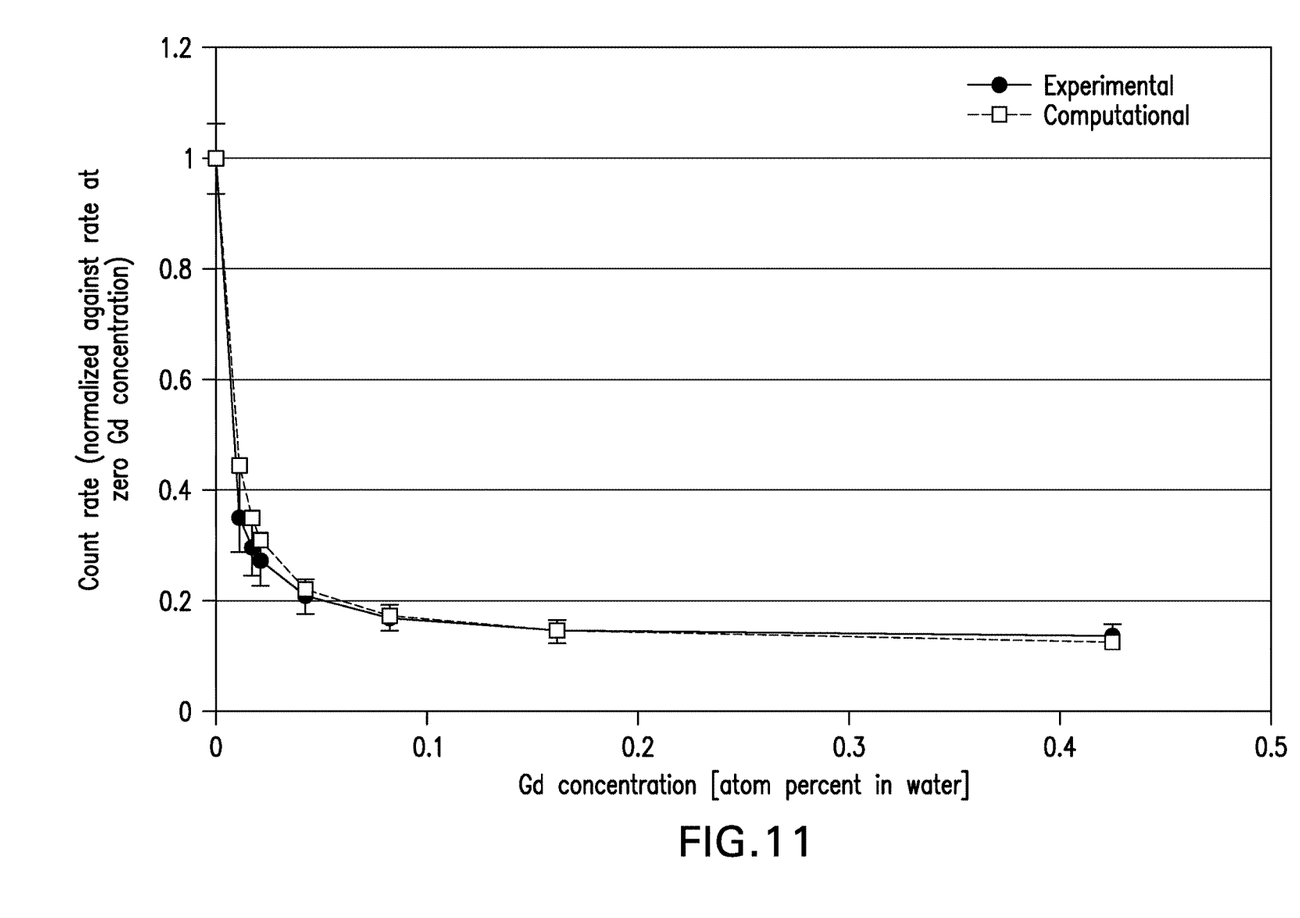
FIG. 11 is a graph of count rate versus Gd concentration where the computational results are compared to the experimental data provided in Table 1. Both sets of results are normalized against their values at zero Gd concentration.

After the experimental setup had been finalized as described, a series of experiments were conducted as detailed in Table 1. Each combination of detector, shielding, and gadolinium concentration was counted for 30 seconds with the reactor operating at 10 kW. The background case listed in the table is an active background measurement where the beam shutter was open and the reactor operating at 10 kW, but the sample container is not present. FIG. 11 displays the results given in Table 1, normalized by the value for 0.0% gadolinium concentration and with the active background subtracted.

TABLE 1

Results for varying concentrations of gadolinium.

| Sample (Gd concentration, atom percent in water) | Counts | St. Dev. |
|---|---|---|
| Background | 10357 | 102 |
| 0 | 133434 | 365 |
| 0.011% | 53338 | 231 |
| 0.017% | 46438 | 215 |
| 0.022% | 43636 | 209 |
| 0.042% | 35690 | 189 |
| 0.082% | 30928 | 176 |
| 0.162% | 27859 | 167 |
| 0.425% | 26804 | 164 |

Figure 10:
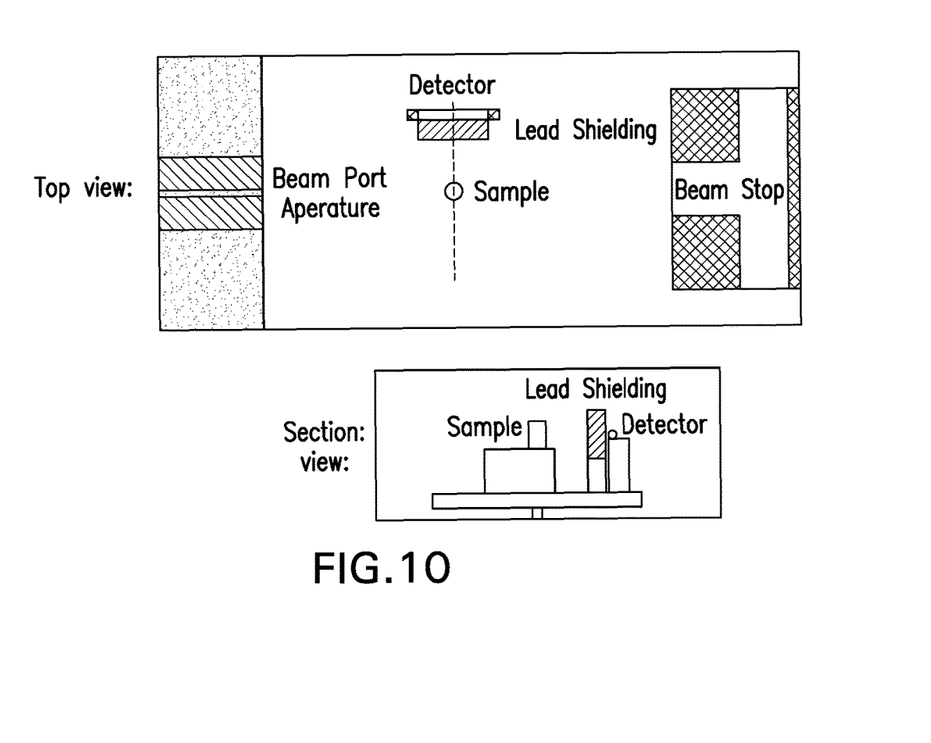
FIG. 10 is a schematic of the MCNPX model of the experimental set up.

The particle transport code MCNPX was used to model the experimental set up. FIG. 10 provides a top down and sectional view of the computational model. The experiment was then modeled, varying the concentration of Gd by atom percent in water from 0.0% to 0.425% as was done to generate the experimental results.

FIG. 11 compares the computational results to the experimental data provided in Table 1. Both sets of results are normalized against their values at zero Gd concentration. FIG. 11 shows good agreement between the computational and experimental results. The error bars on the experimental results in FIG. 11 account for uncertainties in the placement of the vial relative to the neutron beam centerline. These were generated by running the MCNPX model to determine the sensitivity of the results to displacement of the vial by up to 2 cm from its reference position on the beam centerline. Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

What is claimed is:

1. A method of determining a property of a porous rock formation, comprising:
   feeding a gadolinium tracer fluid into the porous rock formation;
      wherein the gadolinium tracer fluid comprises:
         water and a water soluble gadolinium compound; or
         a liquid carrier fluid and a plurality of particles having a mean diameter of less than 1 μm dispersed in the liquid carrier fluid, wherein the plurality of particles comprise gadolinium particles; and
      wherein all particles in the gadolinium tracer fluid have a mean diameter of less than 1 μm;
   applying an emitted radiation to the porous rock formation to thereby produce a signal;
   capturing the signal from the porous rock formation; and
   processing the signal to obtain the property of the porous rock formation.

2. The method of claim 1, wherein the gadolinium tracer fluid comprises the liquid carrier fluid and the plurality of particles having a mean diameter of less than 1 μm dispersed in the liquid carrier fluid, wherein the plurality of particles comprise gadolinium particles, and wherein the liquid carrier fluid comprises a spacer fluid, a drilling fluid, a cementing fluid, a fracturing fluid, a mud fluid, a synthetic fluid, or combinations thereof.

3. The method of claim 1, wherein the gadolinium tracer fluid comprises the liquid carrier fluid and the plurality of particles having a mean diameter of less than 1 μm dispersed in the liquid carrier fluid, and wherein the particles comprise gadolinium oxide.

4. The method of claim 1, wherein the gadolinium tracer fluid comprises the liquid carrier fluid and the plurality of particles having a mean diameter of less than 1 μm dispersed in the liquid carrier fluid, wherein the plurality of particles comprise gadolinium particles, and wherein the concentration of the particles in the gadolinium tracer fluid is from 0.001-1% by volume.

5. The method of claim 1, wherein the emitted radiation is applied at a first time and the signal is captured at a second time.

6. The method of claim 1, wherein the emitted radiation comprises a first number of neutrons at a first energy and the signal comprises a second number of neutrons at a second energy.

7. The method of claim 6, wherein processing the signal comprises determining a time delay, wherein the time delay is the difference between the second time and the first time.

8. The method of claim 7, wherein processing the signal comprises determining a neutron number change, wherein the neutron number change comprises the difference between the first number of neutrons and the second number of neutrons.

9. The method of claim 8, further comprising capturing an additional signal.

10. The method of claim 9, wherein the additional signal is captured at a third time and comprises a third number of neutrons at a third energy.

11. The method of claim 10, wherein processing the additional signal comprises determining a rate of decay, wherein the rate of decay is the difference between the third number of neutrons and the second number of neutrons over a time interval, wherein the time interval is the difference between the third time and the second time.

12. The method of claim 9, wherein the additional signal comprises gamma rays.

13. The method of claim 1, wherein the signal comprises gamma rays.

14. The method of claim 1, further comprising capturing two or more additional signals and wherein the two or more additional signals comprise gamma rays and/or neutrons.

15. The method of claim 1, wherein the gadolinium tracer fluid is fed to the porous rock formation from a borehole and the emitted radiation is applied to the porous rock formation from the same borehole.

16. The method of claim 1, wherein the gadolinium tracer fluid is fed to the porous rock formation from a borehole and the emitted radiation is applied to the porous rock formation from a different borehole.

17. The method of claim 1, wherein the porous rock formation is adjacent to a well, an aquifer, mineral deposit, a contamination site, or combinations thereof.

18. The method of claim 1, wherein the property of the porous rock formation comprises hydrogen index, density, porosity, solid content, water content, fluid content, fluid composition, hydrocarbon content, contaminant content, permeability, or combinations thereof.

19. The method of claim 1, wherein the property of the porous rock formation is Sigma.

* * * * *